United States Patent [19]

Reinecke

[11] Patent Number: 4,575,157

[45] Date of Patent: Mar. 11, 1986

[54] PNEUMATICALLY CONTROLLED RELAY VALVE ARRANGEMENTS

[75] Inventor: Erich Reinecke, Burgdorf, Fed. Rep. of Germany

[73] Assignee: WABCO Westinghouse Fahrzeugbremsen GmbH, Hanover, Fed. Rep. of Germany

[21] Appl. No.: 619,104

[22] Filed: Jun. 11, 1984

[30] Foreign Application Priority Data

Jun. 15, 1983 [DE] Fed. Rep. of Germany ....... 3321566

[51] Int. Cl.⁴ ............................................ B60T 15/02
[52] U.S. Cl. ...................................................... 303/40
[58] Field of Search ...................... 303/6 R, 6 C, 22 R, 303/40, 54

[56] References Cited

U.S. PATENT DOCUMENTS 3,291,539 12/1966 Bueler ............................... 303/40 X
4,300,805 11/1981 Reinecke ........................... 303/40 X

*Primary Examiner*—Duane A. Reger
*Attorney, Agent, or Firm*—J. B. Sotak

[57] ABSTRACT

A pneumatically controlled double seat relay valve including a housing for accommodating a reciprocating control piston having a first reactive surface acted upon by a source of control pressure and having a second reactive surface acted upon by a source of working pressure. A spring biasing valve piston slidably disposed in a tubular projection formed in the control piston. A spring biased slidable valve member disposed in a central bore formed in the housing and including an inlet valve cooperatively associated with an inlet valve seat formed by an annular lip of the central bore. An outlet valve seat carried by the slidable valve member and cooperatively associated with one side of the valve piston to initially close the outlet valve and subsequently open the inlet valve when control pressure is applied to the first reactive surface and for allowing the inlet valve to close when working pressure is applied to the one side of the slidable valve member to overcome the spring bias.

13 Claims, 4 Drawing Figures

PNEUMATICALLY CONTROLLED RELAY VALVE ARRANGEMENTS

FIELD OF THE INVENTION

The invention pertains to pneumatically controlled relay valve arrangements and, more particularly, to a double seat relay valve assembly having a control piston acted upon by a control pressure and including a valve piston member which is slidably disposed in the control piston to open and close an inlet and outlet valve in a given sequential order in response to pressure values acting on the control piston and the valve piston member.

BACKGROUND OF THE INVENTION

A relay valve of this type includes an inlet valve which is formed by a double seat valve which serves as an escape valve and is disclosed in the European catalog of WABCO Westinghouse Fahrzeugbremsen GmbH (catalog page 973 001, February edition 1977). In connection with this known relay valve, the double seat valve exhibits a double valve element having a valve element secured in the housing which forms the inlet valve and having a valve element connected to the control piston which forms the outlet valve.

A relay valve of this type is generally utilized in air brake equipment for vehicles for the quick pressurization and venting of compressed air installations, such as, brake cylinders.

The characteristic curve of such a relay valve is obtained from the relationship of the effective surface of the control piston which is acted upon by control pressure to the effective surface (reaction surface) of the control piston which is responsive to modulated pressure. Accordingly, the maximum outlet pressure was determined either by the maximum control pressure or the maximum value of the inlet working pressure of the relay valve. In the event that a limitation of the modulated working pressure is desired, regardless of the maximum pressure of the control pressure and regardless of the maximum inlet working pressure, the utilization of an additional pressure limiting device in the control line or the working line on either the inlet side or the outlet side is required.

OBJECTS AND SUMMARY OF THE INVENTION

Accordingly, it is an object of this invention to provide a relay valve of the type mentioned above in which the modulated working pressure can be limited in a simple manner without the use of an additional pressure limiting device.

Another object of this invention is to provide a pneumatically controlled relay valve having a control piston carrying a biased valve piston member which is adapted to open and close a double seat inlet and outlet valve in response to pressure supplied to a control chamber and which is adapted to assume a lap position when the working pressure closes the inlet valve.

A further object of this invention is to provide a relay valve comprising, a housing having a control pressure inlet, a working pressure inlet, and a working pressure outlet, a control piston slidably disposed in the housing for establishing a control pressure chamber and a working pressure chamber, a valve mechanism disposed in the housing, the valve mechanism including an inlet and an outlet valve, the inlet valve including a valve seat formed on a central bore wall in the housing, the inlet valve carried by a biased member reciprocally disposed in the central bore, the outlet valve including a valve seat carried by the biased member, the outlet valve including a piston element which is reciprocally movable in the control piston for initially closing the outlet valve and for subsequently opening the inlet valve when control pressure is supplied to the control pressure inlet so that the working pressure chamber is pressurized from the working pressure inlet to the working pressure outlet, the piston element responsive to the working pressure to allow the biased member to close the inlet valve to assume a lap position, and the working pressure causing the piston element to move relative to the control piston to open the outlet valve.

The invention offers the advantage that the desired limitation of the modulated working pressure can be carried out independently from the relationship of the effective surface of the control piston with regard to a specified construction of a relay valve which does not exhibit the aforementioned pressure limitation so that mere modification of the control piston can be undertaken to achieve the desired pressure limitation.

Furthermore, the invention is suitable in an advantageous manner for the control of a spring loaded brake cylinder in an air brake equipment for vehicles. In this case, the pressure limitation can be adjusted to a value which is smaller than the supply pressure of the brake equipment, yet is sufficient to release the spring load. In this manner, the spring loaded brake cylinder is operable comparatively fast and economically.

The invention in general is applicable in relay valves on which the modulated pressure is to be limited. In the event that one deals with a relay valve which exhibits only one inlet valve, a reduction of the modulated pressure to a specific value of limited outlet working pressure can be carried out via a venting valve mechanism which is arranged parallel to the relay valve. This type of venting valve mechanism is activated when the control pressure of the relay valve is reduced.

Such an additional venting valve mechanism is not necessary if a specific relay valve of the known and initially described type with a double seat valve (inlet valve and outlet valve) is involved.

BRIEF DESCRIPTION OF THE DRAWINGS

The invention will be explained in more detail by reference to two operating embodiments and two examples of advantageous applications of the invention, in which.

DETAILED DESCRIPTION OF THE INVENTION

Figure 1:
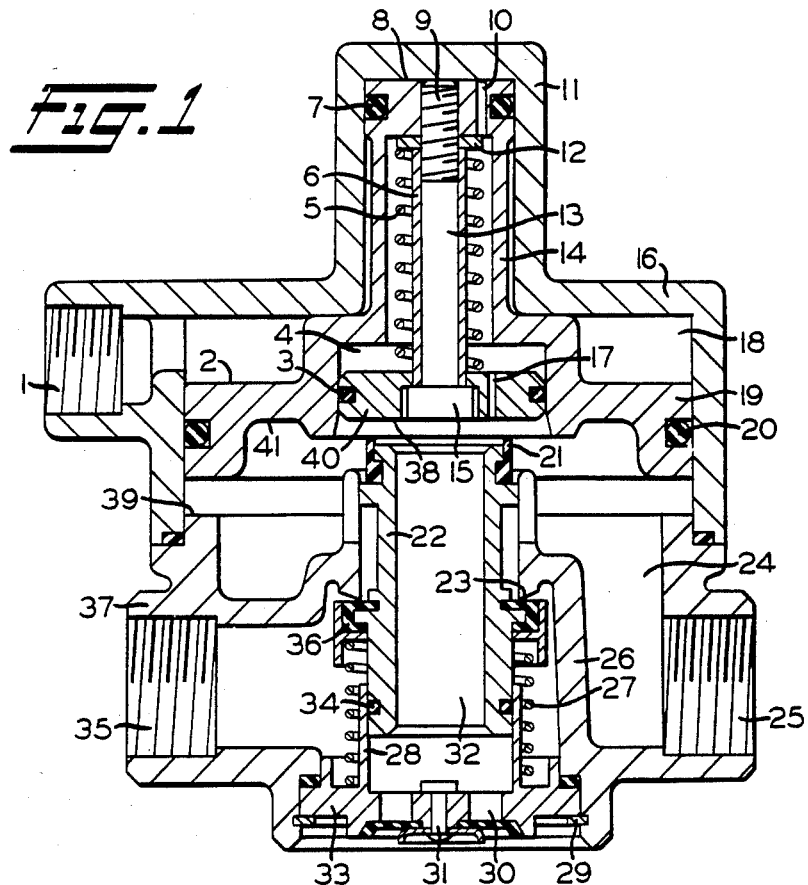
FIG. 1 shows a relay valve with a limited working pressure on the outlet side.

Referring now to the drawings, and in particular to FIG. 1, there is shown a pneumatically controlled relay valve for compressed air equipment in which the control pressure is supplied from the compressed air equipment by way of a control connection 1. In response to the pressure of the control connection, the pressure developed at a working or operating pressure outlet 25 can be controlled up to a specified maximum value. The compressed air conveyed to working pressure outlet 25 is supplied to the relay valve from a suitable reservoir or storage tank (not shown) via a working pressure inlet 35.

The housing of the represented relay valve consists of an upper housing portion 16 and a lower housing portion 37. As shown, there is provided in the upper portion of the housing 16, a control pressure chamber 18 which is arranged to be in communication with the control pressure connection 1. The volume of the control pressure chamber 18 is restricted at the top by the underside of the upper portion 16 and at the bottom by the upperside of a control piston 19. The control piston 19 is arranged to slide or move in the upper portion of the housing 16 and is sealed against the inner cylindrical wall of the upper portion of the housing 16 by a packing ring or gasket 20.

A tubular projection 14 of the control piston 19 is guidingly received in cylindrical or tubular extension 11 formed in the upper portion of the housing 16. The projection 14 is sealed against the cylindrical wall of the extension portion 11 by a packing ring or gasket 7. Thus, the effective surface 2 of the control piston 19 which is acted upon by control pressure in the control pressure chamber 18 takes the form of a circular surface. The control piston 19 has a stepped or graduated bore 4 which receives a valve element piston 40. The valve element piston 40 is located in an enlarged part of the graduated bore 4 of the control piston 19 and is sealed against the cylindrical wall of the graduated bore by a gasket 3. The valve element piston 40 itself includes a graduated central bore which is adapted to receive the head 15 as well as the shaft of a screw 13.

The screw 13 is threaded into an appropriate tapped hole formed in the upper end of the tubular projection 14 of the control piston 19 by screw threads 9. A control spring 5 is disposed in the inner narrow section of the graduated bore 4 of the control piston 19. The control spring 5 is arranged to surround the screw shaft 13, and the top end is adapted to rest against a spring cap or collar 12. The spring collar 12 is restricted by the inner upper end of the tubular projection 14 of the control piston 19. The lower end of the spring 5 rests against the upper side of the valve element piston 40. A spacer bushing 6 is disposed between the screw 13 and the control spring 5.

Thus, the valve element piston 40 is urged by the force of the control spring 5 toward the enlarged portion of the graduated bore 4 of the control piston 19. The downward movement of the valve element piston 40 is limited by the head 15 of the screw 13. It will be seen that a chamber 8 is located between the upper end of the tubular projection 14 of the control piston 19 and the inner upper end of the tubular extension 11 of the housing 16. The chamber 8 and the graduated bore 4 of the control piston 19 are interconnected via a bleed hole 10 formed in the upper end of the tubular projection 14. The chamber formed by the graduated bore 4 and the valve element piston 40 can be vented via a bleed hole 17 in the enlarged body portion of piston 40.

The double seat valve includes an output chamber 24 which is located below the control piston 19. The volume of chamber 24 is varied and limited by the control piston 19 and is connected with the working pressure outlet 25. The prevailing pressure in the output chamber 24 acts upon the under circular surfaces of the control piston 19 and the valve element piston 40. Thus, the surfaces serve as reaction working areas. The control piston 19 is enclosed by wall 26 formed on the lower portion of the housing 37. The housing wall 26 includes a central bore in which is disposed a double valve element 22. The double valve element 22 is designed as a tubular member. The upper end 21 of the double valve element 22 is designed as a flexible valve seat. The upper valve seat 21 cooperates with the underside of the valve element piston 40 which is designed as sealing surface 38 to form an outlet valve 21, 38. The outlet valve 21, 38 interconnects the output chamber 24 with a central bore 32 formed in the tubular double valve element 22.

An annular shoulder member 36 is carried by the double valve element 22 and is located outside the output chamber 24. The annular member 36 is designed as a flexible sealing surface which cooperates with an annular valve seat 23. The valve seat 23 is part of the central portion of the housing wall 26. Thus, the annular member and seat form an inlet valve 23, 36. The inlet valve 23, 36 is adapted to interconnect the output chamber 24 with the working pressure inlet 35.

The lower end of the reciprocal double valve element 22 is located in a guide adapter member which is disposed in the lower portion of the housing 37. The guide member 33 is securely held in place by means of a retaining ring 29. That is, the lower end of the valve element 22 fits into an upstanding sleeve-like projection 28 which functions as a sealed guide for the double valve element 22. The sealing is accomplished by a gasket or packing ring 34 which encircles the double valve element 22. A biasing spring 27 is located between the guide member 33 and the member 36 of the double valve element 22. The spring 27 biases and acts upon the double valve element 22 to cause it to move toward its closed position so that the inlet valve 23, 36 is normally closed.

The central bore 32 of the double valve element 22 is vented to atmosphere by openings 30 which are provided in the guiding member 33. The internal parts of the relay valve are protected against dirt and spray water by a flexible cover or flap 31.

The presently described relay valve operates in the following manner:

Now let us assume that fluid control pressure is conveyed to the control connection 1 and, in turn, is admitted to the control chamber 18. Under this condition, the control piston 19 is moved toward the double valve element 22 so that the outlet valve 21, 38 becomes closed. While the piston 19 moves, the valve element piston 40 remains in the position as shown in relation to the control piston 19. As the piston 19 continues to move downward, the inlet valve 23, 36 will subsequently become opened. The opening of inlet valve 23, 36 allows the operating air pressure which is being supplied to the pressure inlet 35 to flow into the output chamber 24. The pressure of the modulated working pressure which is building up in the output chamber 24 acts upon the bottom effective surface 41 of the control piston 19 and the exposed portion of bottom surface 38 at piston 40. Thus, these two surfaces act as reaction surfaces.

As the pressure in the output chamber 24 continues to increase, an equilibrium will be reached at some point. That is, when the force exerted on the top effective surface 2 of the control piston 19 by the modulated pressure becomes equal to the force exerted on the reaction surfaces 41 and 38 by the modulated pressure, a point of equilibrium will exist. Shortly after or prior to reaching this point of equilibrium which is dependent upon the friction losses and the force of the spring 27, a neutral or lap position is reached wherein both the inlet valve 23, 36 and the outlet valve 21, 38 are closed.

Now if the control pressure in chamber 18 is reduced, the control piston 19 will begin to move upwardly under the pressure force on the reaction surfaces 41 and 38 so that the outlet valve 21, 38 will become opened. Thus, the opening of the outlet valve 21, 38 causes the pressure in the output chamber 24 to be reduced. The reduction of pressure in the output chamber 24 continues until an equilibrium of the forces acting on the control piston 19 again exists. Now if the control pressure chamber 18 is completely vented, the output chamber 24 is also vented completely to atmosphere. The operation of the present relay valve thus far described is similar to the mode of operation of conventional relay valves.

Let us now regress to the point where outlet valve 21, 38 is closed so that a further increase of control pressure in the control pressure chamber 18 causes the control piston 19 to move downwardly and thus opens the inlet valve 23, 36. In the present invention, if the modulated pressure in the output chamber 24 reaches a level where the force which the modulated pressure places on the outer circular effective surface of the valve element piston 40, which is limited by the valve seat 21 and the outer diameter of the valve element piston 40 overcomes the biasing force by the tension spring 5, the valve element piston 40 is moved upwardly relative to the control piston 19. This is due to the fact that the inlet valve 23, 36 is still in its opened position, and the control piston 19 shifts relative to the valve element piston 40 into a neutral or lap position. Any further increase of pressure in the control pressure chamber 18 will cause the control piston 19 to move downwardly and to finally come to rest on an internal shoulder 39 formed on the upper portion of the lower housing 37. As the value of control pressure in the control pressure chamber 18 increases, the valve element piston 40 is pushed upward by the modulated pressure in the output chamber 24 to such a point that the inlet valve 23, 36 is closed and the outlet valve 21, 38 is opened until the pressure in the output chamber 24 is bled off and reduced to such a value which holds the valve element piston 40 in a neutral position in which the inlet valve 23, 36 as well as the outlet valve 21, 38 are closed.

The valve element piston 40 is designed in such a manner that it moves in an opposite direction to that of the control piston 19. In practice, the distance or stroke length of the piston 40 is longer than the distance which the control piston 19 travels after the opening of the inlet valve 23, 36 at normal relay function until coming to rest on the shoulder stop 39. It will be recognized that the compressive force of the control spring 5 determines the value at which the pressure in the output chamber 24 can no longer be increased. Thus, the working pressure at outlet 25 is limited to the above-mentioned value.

Now as the entering control pressure is reduced, the control piston 19 initially moves upwardly until the level of the control pressure is reached wherein the outlet valve 21, 38 is opened due to the lifting of the sealing surface 38 from the valve seat 21.

The bleed holes 10 and 17 limit the pressure value in the output chamber 24 and thus the characteristics of the relay valve. The response characteristics of the relay valve are further influenced by the size and strength of the control springs. There is also significance due to the fact that the bleed hole 17 is located inside the surface of the piston 40 which is enclosed by the valve seat 21.

It will be appreciated that instead of the screw member 13, a suitably shaped stud may be utilized to secure the valve element piston 40. Furthermore, it is possible to develop the support of the control spring 5 on the valve element piston 40 and/or on the end of the pipe-shaped projection 14 of the control piston 19 in such a manner that the compressive force of the control spring 5 can be varied. In this manner, the value of the maximum attainable pressure in the output chamber 24 can be adjusted to various situations or application conditions of the relay valve.

Figure 2:
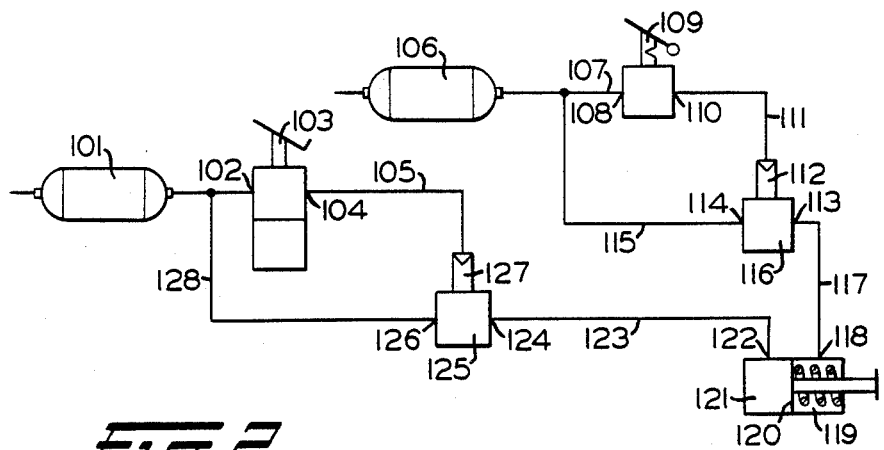
FIGS. 2 and 3 show two examples for advantageous applications of a relay valve of the type illustrated in FIG. 1.

Referring now to FIG. 2, there is shown a portion of a compressed air brake system which may be used in commercial vehicles. The illustrated pneumatic system is one example of a practical application for a pair of relay valves of the type shown and disclosed in FIG. 1. It will be appreciated that only those parts of the compressed air brake system are represented which are absolutely necessary for a complete understanding of one application of a relay valve of the type shown in FIG. 1.

In describing the operation of FIG. 2, it will be understood that the system includes a combination spring loaded brake cylinder 120 consisting of a service brake cylinder 121, for example, a diaphragm cylinder and a spring loaded cylinder 119 as well as a motor vehicle brake valve 103 operated by the foot of the driver for a service braking action and a manually operable hand brake valve 109 for auxiliary braking or locking brake action. The motor vehicle brake valve 103 and the hand brake valve 109 serve as compressed air control valves for the subsequently added brake equipment.

As shown, a storage tank 101 supplies compressed air to the inlet port 102 of the motor vehicle brake valve 103 which is arranged as a conventional dual circuit. While both of the brake circuits are connected to the motor vehicle brake valve 103, only one brake circuit is shown and disclosed in the following detailed discussion. The modulated brake pressure developed on output connection 104 of the motor vehicle brake valve 103 is fed to a pneumatic control connection 127 via a line 105. A working or operating pressure inlet 126 of the relay valve 125 is connected to the storage tank 101 via a line 128. The working pressure developed on outlet 124 of the relay valve 125 is a function of the pressure that is conveyed to the control connection 127. That is, the relay valve modulates the working pressure in accordance with the control pressure. The outlet port 124 of the relay valve 125 is connected to the inlet port 122 of the service brake cylinder 121 via a line 123.

The apparatus thus far described serves the purpose of pressurizing the service brake cylinder 121 as a function of the position of the pedal of the motor vehicle brake valve 103 via the relay valve 125. Hence, the maximum working pressure at the outlet 124 of the relay valve 125 can only be equal to the pressure in the storage tank 101, namely, 8 bar.

It will be seen that the portion of the brake circuit which controls the hand brake valve 109 includes a storage tank 106 which stores a maximum pressure of 8 bar. The storage tank 106 is connected to an inlet port 108 of the hand brake valve 109 via line 107, and is connected to an inlet 114 of a second relay valve 116 via line 115. The hand brake valve 109 is constructed in such a way that, in disengaged condition the outlet port 110 is at full working pressure, namely, 8 bar. Conversely, an increasing manipulation of the operating lever reduces this pressure appearing at the outlet port 110. In other words, the hand brake valve 109 works as a pressure venting device.

The outlet port 110 of the hand brake valve 109 is connected to a pneumatic control connection 112 of the relay valve 116 via line 111. The working pressure outlet 113 of the relay valve 116 is connected to an inlet port 118 of the release chamber of the spring loaded cylinder 119 via line 117. The relay valve 116 is not a conventional relay valve but is a relay valve of the type as shown and disclosed in FIG. 1. The pneumatic control connection 112 of the relay valve 116 corresponds with the control connection 1 of the relay valve of FIG. 1, and the connections 114 and 113 of the relay valve 116 correspond with the connections 35 and 25 of the relay valve of FIG. 1.

It will be appreciated that the relay valve 116 in FIG. 2 functions in the manner as described in FIG. 1 so that the working pressure at outlet 113 of the relay valve 116 which serves as release pressure for the spring loaded cylinder 119 is limited to a maximum value which is smaller than the indicated value of 8 bar for the working pressure of the storage tank 106. The maximum value indicated for the working pressure at outlet 113 of the relay valve 116 is selected in such a way that it corresponds with the required release pressure of the spring loaded cylinder 119. In the present example, the pressure is at a value of 6 bar since the spring loaded cylinder 119 is safely released at this value.

During the initial operation of the hand brake valve 109, the control pressure at control connection 112 of the relay valve 116 is reduced from 8 bar to 6 bar without reducing the working pressure at connection 113 of the relay valve 116. Only when the pressure falls below the value of 6 bar at control connection 112 will the pressure at outlet port 113 be reduced. This means that the pressure change at connection 113 can very quickly follow a reduction of control pressure at control connection 112, without first needing an air volume equal to the pressure differential between 8 bar and 6 bar to flow from the spring loaded cylinder 119 through the relay valve 116. Thus, with the utilization of a conventional hand brake valve for controlling a renewed release of the spring loaded cylinder 119, it is necessary to only build up the control pressure to 8 bar in the lines between the hand brake valve and control connection 112 of the relay valve 116 and in the hand brake valve itself. The release pressure within the spring loaded cylinder 119 is to be built up to 6 bar. Thus, this results in considerable savings in an amount of air volume that is required, and thus the energy requirement is appreciably reduced.

Figure 3:
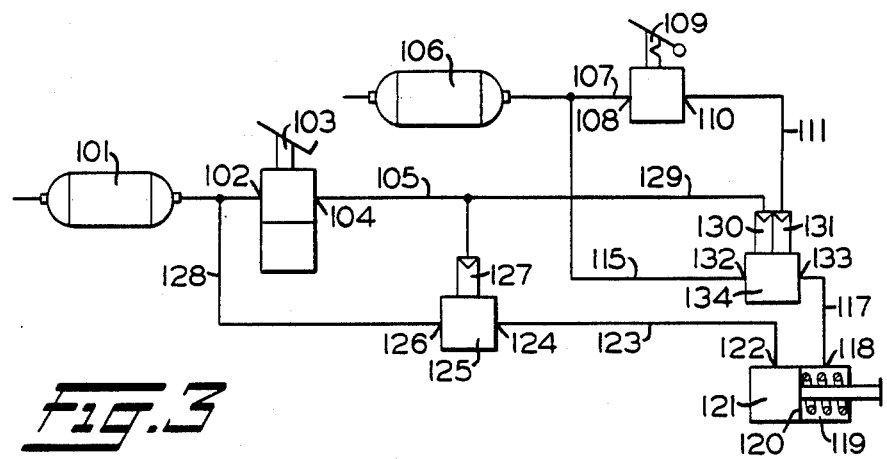

A further application of the utilization of a relay valve of the type represented in FIG. 1 is shown in the pneumatic brake control circuit of FIG. 3. As with the installation relating to FIG. 2, the embodiment of FIG. 3 deals with a portion of a compressed air brake equipment for commercial vehicles. It will be noted that the corresponding components and connections of FIG. 3 use the same reference numerals as those of FIG. 2, and that the kindred components and connections perform the same functions in FIG. 2 as well as in FIG. 3.

The difference between the compressed air brake equipment of FIG. 2 and that of the installation according to FIG. 3, is that instead of using the relay valve 116 for the pressurization and venting of the spring loaded cylinder 119 being controlled by a single pneumatic circuit, the spring loaded cylinder 119 is controlled by a relay valve 134 which has dual pneumatic circuits.

The relay valve 134 has two pneumatic control connections 130 and 131. The first control connection 130 is connected to the connection 104 of the motor vehicle brake valve 103 via lines 129 and 105, and the second control connection 131 is connected to connection 110 of the hand brake valve 109 via line 111. The working pressure inlet 132 of the relay valve 134 is connected to the storage tank 106 via the line 115. The working pressure outlet 133 of the relay valve 134 is connected with the inlet 118 of the spring loaded cylinder 119 via the line 117.

The relay valve 134 of the subject arrangement operates as an overload protection relay valve which is described in more detail in the German patent specification No. 18 14 722 only in relation to its mode of operation. In this arrangement, it is necessary to prevent simultaneous operation of the motor vehicle brake valve 103 and the hand brake valve 109 since a superelevated brake force may be generated which could endanger and cause failure of mechanical parts of the brake system. The desired results are achieved with the relay valve 134 which prevents the concurrence or simultaneous occurrence of a full pressurization of the service brake cylinder 121 and a full venting of the spring loaded cylinder 119.

The remaining portions of the relay valve 134 work in the same way as the corresponding parts of the relay valve 116 of FIG. 1. This means that the working pressure at outlet port 133 of the relay valve 134 is limited to a maximum value of 6 bar even if the control pressures at the control connections 130 and 131 have a value of 8 bar. Thus, the relay valve 134 is possessed of the advantages which have been described in relation to relay valve 116 in FIG. 2. It will be seen that the relay valve 134 also has the advantage that the control of the relay valve of a conventional motor vehicle brake valve is provided with working pressures or control pressures having values of 8 bar. An operating embodiment of a practical design of the relay valve 134 is illustrated in FIG. 4.

In examining the brake systems of FIG. 2 and FIG. 3, it will be noted that each system employs a relay valve 125 which is constructed in accordance with FIG. 1. That is, it is also possible to utilize the relay valve 125 in a way as it is described in FIG. 1. This is especially advantageous if the pressure stored in the storage tank 101 is at a value which is higher than the maximum permissible pressure within the service brake cylinder 121. In certain instances, the pressure in the storage tank and/or in the entire brake system on the control side can amount to approximately 10 bar while the pressure in the service brake cylinder 121 can only amount to 8 bar.

Figure 4:
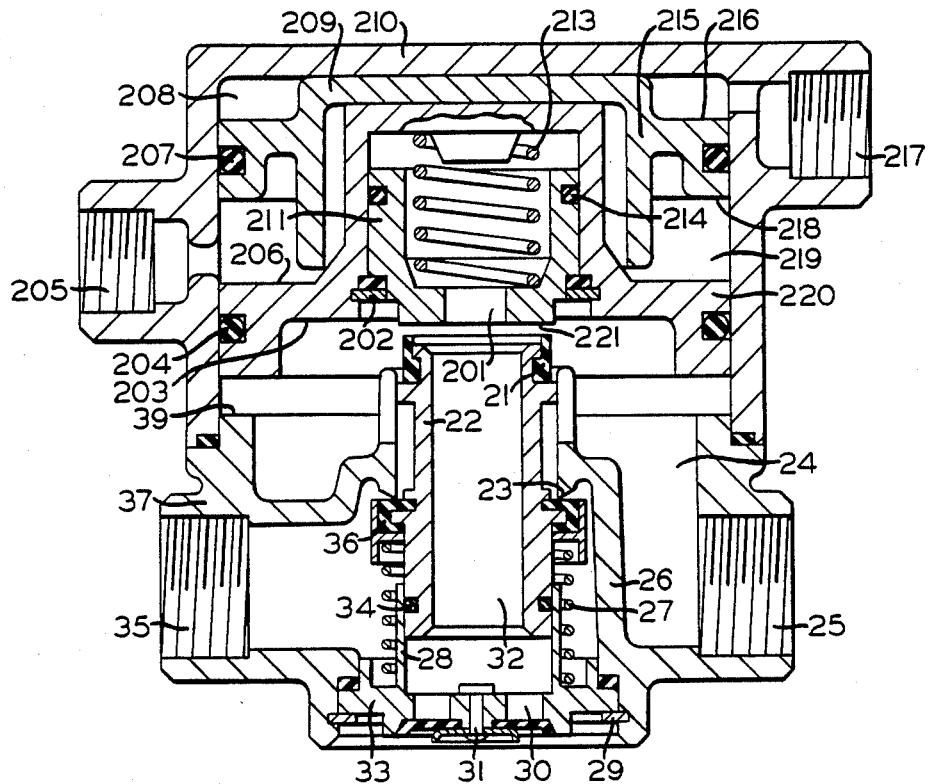
FIG. 4 shows a relay valve capable of being controlled by a dual circuit with a limited working pressure on the outlet side.

Referring now to FIG. 4, there is shown a double seat relay valve which is controllable by a dual circuit arrangement. It will be seen that the lower portion of the housing 37 of FIG. 4 coincides with the lower portion of the housing 37 of the relay valve of FIG. 1. The same reference numerals are used in FIG. 1 as those in FIG. 4 so that the components are structurally equivalent to perform the same functions. In addition, the control piston 220 which is arranged in the upper portion of the housing 210 of the relay valve of FIG. 4 has the same function as the control piston 19 of FIG. 1.

The control piston 220 is guided within the central bore of housing 210 and is sealed by means of a sealing packing ring 204. The upper control side, namely, the effective working surface area 206 of the control piston 220 is acted upon by the control pressure prevailing in a control pressure chamber 219. The fluid control pressure is supplied to the control pressure chamber 219 via a first control connection 205. The control piston 220 exhibits an upward tubular projection which is open at the bottom and is closed at the top. It will be seen that a valve element piston 211 is arranged Within the tubular projection. The valve element piston 211 is functionally equivalent to the valve element piston 40 of FIG. 1. The valve element piston 211 is pressure sealed by means of a sealing packing ring 214, and is restrained in the control piston 220 by means of a retaining ring 202. A compression control spring 213 arranged in the hollow or tubular projection of the control piston 220 urges the valve element piston 211 against the support stop provided by the retaining ring 202. The control spring 213 has the same function as the control spring 5 of FIG. 1.

A central bleed bore 201 is located in the valve element piston 211 for venting the chamber 212 in which is disposed the compression spring 213.

The valve element piston 211 has another effective working surface area 221 located on its underside, and the valve seat 21 cooperates with the double valve element 221 to form an outlet valve 21, 221. The function of outlet valve 21, 221 coincides with the outlet valve 21, 38 of the relay valve of FIG. 1. The lower circular surfaces of the control piston 220 and the valve element piston 211 form the reaction surface 203, 221 of the system as will be described hereinafter.

As shown, an additional relay piston 209 is disposed above the control piston 220. The additional working relay piston 209 is located in the upper portion of the housing 210 with its upper effective surface 216 defining an additional control chamber 208. The additional relay piston 209 is sealed by means of a packing sealing ring 207. The piston 209 is arranged in such a way that during an upward movement, the top portion 215 comes in contact with the tubular extension of the control piston 220. In this manner, both pistons 209 and 220 are actuated in a serial or tandem manner.

The above mentioned overload protection function of the relay valve as described in FIG. 4 is possible due to the fact that the control connection 205, namely, connection 131 of FIG. 3, is connected with the hand brake valve 109, while the additional control connection 217, namely, connection 130 in FIG. 3, is connected with the motor vehicle brake valve 102.

Now when pressure is acted on working surface area 206 of the control piston 220 by the control pressure which is modulated by the hand brake valve 109, the same modes of operation result as those which occur in the relay valve of FIG. 1.

Now if at the same time, the hand brake valve is actuated by the reduction of the pressure in the release chamber 120 of the spring loaded cylinder 119 which is connected to the connection 25, and the motor vehicle brake valve of the service brake is actuated, the additional relay piston 209 is acted upon by a control pressure via the control connection 217. Now if the pressure in the additional control pressure chamber 208 exceeds the pressure in the control pressure chamber 219 which is effective upon the bottom working surface 218 of the additional relay piston 209, the additional relay piston 209 is moved downwardly until it comes to rest on the control piston 220. At the same time, the control piston 220 is also moved downwardly even though there appears to be a reduction of pressure in the control chamber 219. This results in a renewed increase of working pressure in the output chamber 24 and thus in the release chamber of the spring loaded cylinder. The same overload protection function also exists when the hand brake valve is connected to the control connection 217, and the motor vehicle brake valve is connected to the control connection 205.

The above described operating systems exemplify several applications of the subject invention which utilize relay valves having double seat valves with an inlet valve and an outlet valve. However, it is understood that the invention may also be utilized in connection with a relay valve which employs a single controlled inlet. Even with this type of relay valve the outlet working pressure is then limited to a specified value. A reduction of the modulated working pressure by this type of relay valve may be difficult; however, the pressure reduction may be accomplished by employing an additional venting valve mechanism which is connected in parallel to the relay valve. In practice, the venting valve mechanism is activated if the control pressure of the relay valve drops. Such a relay valve which includes only one controlled inlet may also be utilized for the control of a spring loaded brake cylinder or a service brake cylinder if there is an additional venting of the brake cylinder when a reduction of the control pressure occurs in the relay valve.

It is also possible to modify the valve element piston so that it does not directly serve as a valve element but serves as a means for actuation of a valve element which is connected to it. This type of construction is especially useful for a relay valve which includes only one controlled inlet.

Having thus described my invention, what I claim as new and desire to secure by Letters Patent, is:

1. A relay valve comprising, a housing having a control pressure inlet, a working pressure inlet, and a working pressure outlet, a control piston slidably disposed in said housing for establishing a control pressure chamber and a working pressure chamber, a valve mechanism disposed in said housing, said valve mechanism including an inlet and an outlet valve, said inlet valve including a valve seat formed on a central bore wall in said housing, said inlet valve carried by a biased member reciprocally disposed in said central bore, said outlet valve including a valve seat carried by said biased member, said outlet valve including a piston element which is reciprocally movable in said control piston for initially closing said outlet valve and for subsequently opening said inlet valve when control pressure is supplied to said control pressure inlet so that said working pressure chamber is pressurized from said working pressure inlet to said working pressure outlet, said piston element responsive to said working pressure to allow said biased member to close said inlet valve to assume a lap position, and said working pressure causing said piston element to be movable relative to said control piston to open said outlet valve.

2. The relay valve, according to claim 1, wherein said outlet valve and said inlet valve form a double seat valve.

3. The relay valve, according to claim 2, wherein said piston element is movable against the force of a control spring over a distance which is greater than the distance traveled by said control piston after the opening of said inlet valve until coming to rest on the stop.

4. The relay valve, according to claim 3, wherein said control spring is disposed in a chamber which is connected with the atmosphere.

5. The relay valve, according to claim 4, wherein said spring chamber is connected to atmosphere by an opening formed in said piston element which can be covered by said outlet valve seat.

6. The relay valve, according to claim 3, wherein said piston element is retained by a threaded stud which is fastened to said control piston, said threaded stud includes a head on which said piston element rests under the force of the control spring.

7. The relay valve, according to claim 6, wherein said control spring is trapped between said piston element and said control piston.

8. The relay valve, according to claim 1, wherein said control pressure inlet is connected with a compressed air control valve of a compressed air brake equipment, and said working pressure outlet is connected with the pressure chamber of a brake cylinder.

9. The relay valve, according to claim 8, wherein said working pressure inlet is connected with a storage source of the compressed air brake equipment.

10. The relay valve, according to claim 9, wherein a hand brake valve serves as a compressed air control valve, and said working pressure outlet is connected with a release pressure chamber of a spring loaded brake cylinder.

11. The relay valve, according to claim 8, wherein a service brake valve serves as a compressed air control valve of a motorcar brake valve, and said working pressure outlet is connected with the pressure chamber of a service brake cylinder.

12. The relay valve, according to claim 2, wherein said control piston is formed by a relay piston operating said double seat valve which can be controlled by a dual circuit.

13. The relay valve, according to claim 12, wherein said dual circuit includes a first relay piston which is acted upon by a first control pressure, and a second relay piston which is acted upon by a second control pressure, both of the relay pistons define a control chamber which is connected to said second control pressure, both of the relay pistons are arranged in such a manner that said second relay piston is mechanically movable by said first relay piston, said first control pressure is supplied by a hand brake valve, and said second control pressure is supplied by a service brake valve.

* * * * *